US012571724B2

(12) United States Patent
Manassen et al.

(10) Patent No.: US 12,571,724 B2
(45) Date of Patent: Mar. 10, 2026

(54) SINGLE WAFER ORIENTATION TOOL-INDUCED SHIFT CLEANING

(71) Applicant: KLA Corporation, Milpitas, CA (US)

(72) Inventors: Amnon Manassen, Haifa (IL); Peter Paquet, Ann Arbor, MI (US); Yingpin Wu, Taipei (TW); Fang-Jyun Yeh, Tainan (TW); Suryanarayanan Ganesan, San Ramon, CA (US); Jordan Pio, Hillsboro, OR (US); Shankar Krishnan, Santa Clara, CA (US); Taher Kagalwala, Fremont, CA (US); Derrick A. Shaughnessy, San Jose, CA (US); Yan Zhang, Fremont, CA (US); Stilian Pandev, Santa Clara, CA (US); Min-Yeong Moon, Ann Arbor, MI (US)

(73) Assignee: KLA Corporation, Milpitas, CA (US)

( * ) Notice: Subject to any disclaimer, the term of this patent is extended or adjusted under 35 U.S.C. 154(b) by 0 days.

(21) Appl. No.: 18/919,048

(22) Filed: Oct. 17, 2024

(65) Prior Publication Data

US 2025/0137920 A1 May 1, 2025

Related U.S. Application Data

(60) Provisional application No. 63/545,796, filed on Oct. 26, 2023.

(51) Int. Cl.
*G01N 21/21* (2006.01)
*G01N 21/95* (2006.01)

(52) U.S. Cl.
CPC ....... *G01N 21/211* (2013.01); *G01N 21/9501* (2013.01); *G01N 2021/213* (2013.01); *G01N 2201/0636* (2013.01)

(58) Field of Classification Search
CPC ........... G01N 2021/213; G01N 21/211; G01N 21/9501; G01N 2201/0636
See application file for complete search history.

(56) References Cited

U.S. PATENT DOCUMENTS 7,433,039 B1 10/2008 Levinski et al.
10,101,670 B2 10/2018 Pandev et al.
(Continued)

FOREIGN PATENT DOCUMENTS

WO 2016164372 A1 10/2016
WO 2023158661 A2 8/2023

OTHER PUBLICATIONS

Korean Intellectual Property Office, International Search Report and Written Opinion received in International Application No. PCT/US2024/052199, Jan. 24, 2025, 7 pages.

*Primary Examiner* — Tri T Ton
(74) *Attorney, Agent, or Firm* — Suiter Swantz IP

(57) ABSTRACT

A metrology system may include a spectroscopic metrology sub-system and a controller, the controller including one or more processors configured to execute program instructions configured to cause the one or more processors to: generate a tool-induced shift (TIS) model of a training sample by the metrology sub-system comprising: receiving training data from metrology measurements of the training sample, the training data comprising spectral data associated with at least one off-diagonal Mueller matrix element generated by one or more first measurements of the training sample at a first azimuthal angle and one or more second measurements of the training sample at a second azimuthal angle, deriving overlay spectra data and TIS spectra data from the training data, decomposing the overlay spectra data and the TIS spectra data, and inferring a TIS signature for the training sample; and to remove the TIS signature from a test sample.

27 Claims, 5 Drawing Sheets

(56)          References Cited

U.S. PATENT DOCUMENTS

| 2006/0115751 | A1 |   | 6/2006 | Fay et al. |
| 2013/0286395 | A1 |   | 10/2013 | Lee et al. |
| 2014/0172394 | A1 |   | 6/2014 | Kuznetsov et al. |
| 2015/0046121 | A1 |   | 2/2015 | Dziura et al. |
| 2023/0258446 | A1 | * | 8/2023 | Moon .................... H01L 22/12 |
|  |  |  |  | 702/155 |

* cited by examiner

SINGLE WAFER ORIENTATION TOOL-INDUCED SHIFT CLEANING

CROSS-REFERENCE TO RELATED APPLICATION

The present application claims the benefit under 35 U.S.C. § 119 (e) of U.S. Provisional Application Ser. No. 63/545,796, filed Oct. 26, 2023, which is incorporated herein by reference in the entirety.

TECHNICAL FIELD

The present disclosure relates generally to overlay metrology and, more particularly, to removal of metrology subsystem errors from metrology measurements.

BACKGROUND

Overlay (OVL) metrology technologies continually require refinement to keep pace with the development of higher circuit densities in semiconductor lithography. For example, relatively high numbers of inspection sites per wafer are required for after-develop inspection (ADI) OVL control to enable higher-order model corrections. Correction Per Exposure (CPE) methods are increasingly being used by customers, which further drives the need for more intra-field target measurements. As a response to the increased sampling requirement brought on by increased circuit densities, spectral ellipsometry methods have been developed, particularly for measuring after-etch inspection (AEI) device OVL.

A challenge facing spectral ellipsometry is its asymmetric architecture contributing to Tool Induced Shift (TIS) which must be removed or cleaned from the reported OVL. One approach to clean TIS from the reported OVL is measuring it by averaging measurements in two wafer orientations followed by subtraction of the result from the measured OVL. However, performing this procedure for the measurement of each site is time consuming, leading to increased costs. Therefore, it may be desirable to provide systems and methods for removing TIS from the OVL measurements without the need to take measurements in two wafer orientations.

SUMMARY

A spectroscopic metrology system is disclosed, in accordance with one or more embodiments of the present disclosure. In one illustrative embodiment, the spectroscopic metrology system includes a spectroscopic metrology subsystem. and a controller communicatively coupled to the spectroscopic metrology sub-system, the controller including one or more processors configured to execute program instructions. In another illustrative embodiment, the instructions are configured to cause the one or more processors to: generate a tool-induced shift (TIS) model of a training sample by the spectroscopic metrology sub-system including: receiving training data from metrology measurements of the training sample, the training data including spectral data associated with at least one off-diagonal Mueller matrix element generated by one or more first measurements of the training sample at a first azimuthal angle and one or more second measurements of the training sample at a second azimuthal angle; deriving overlay spectra data and TIS spectra data from the training data; decomposing the overlay spectra data and the TIS spectra data; and based on the training data and a decomposition of the overlay spectra data and the TIS spectra data, inferring a TIS signature for the training sample. In another illustrative embodiment, the instructions are configured to cause the one or more processors to remove the TIS signature from a test sample including: receiving spectra data for a single azimuthal angle measurement of the test sample; and removing the TIS signature from the single azimuthal angle measurement of the test sample based on the TIS model.

A method for removing a TIS signature from a metrology measurement is disclosed, in accordance with one or more embodiments of the present disclosure. In one illustrative embodiment, the method includes generating a TIS model of a training sample by a spectroscopic metrology sub-system including: receiving training data from metrology measurements of the training sample, the training data including spectral data associated with at least one off-diagonal Mueller matrix element generated by one or more first measurements of the training sample at a first azimuthal angle and one or more second measurements of the training sample at a second azimuthal angle; deriving overlay spectra data and TIS spectra data from the training data; decomposing the overlay spectra data and the TIS spectra data; and based on the training data and a decomposition of the overlay spectra data and the TIS spectra data, inferring a TIS signature for the training sample; and removing the TIS signature from a test sample including: receiving spectra data for a single azimuthal angle measurement of the test sample. In another illustrative embodiment, the method includes removing the TIS signature from the single azimuthal angle measurement of the test sample based on the TIS model.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures.

DETAILED DESCRIPTION

Figure 1A:
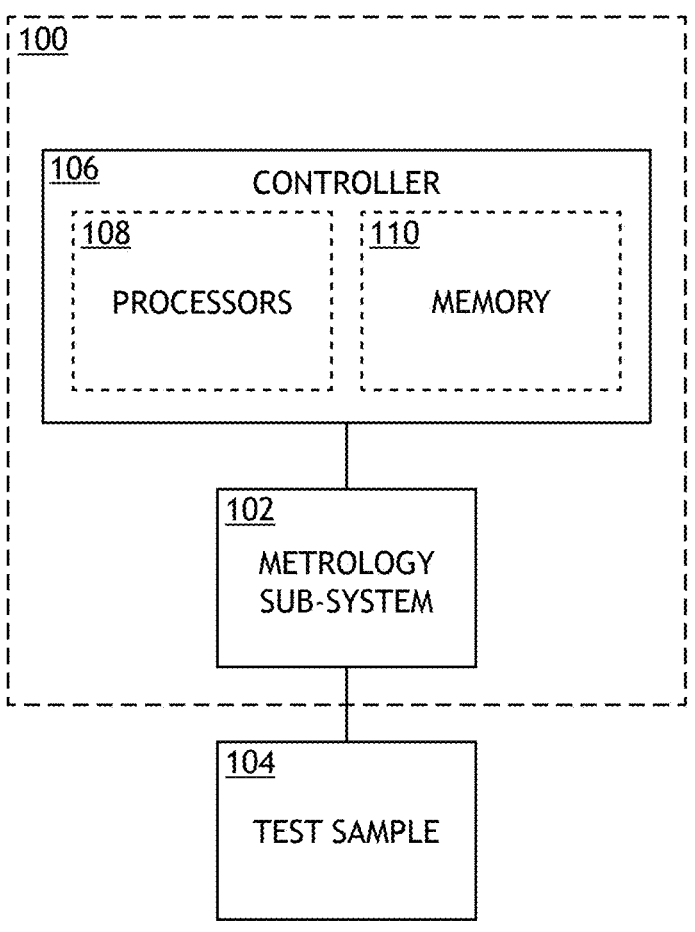
FIG. 1A illustrates a conceptual view of a semiconductor device metrology system, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the present disclosure.

Embodiments of the present disclosure are directed to systems and methods for removing a TIS signature from OVL measurements of a test sample.

For the purposes of the present disclosure, the term overlay (OVL) is used to describe relative positions of features on a sample fabricated by two or more lithographic patterning steps. For example, a multi-layered device may include features patterned on multiple sample layers using different lithography steps for each layer, where the alignment of features between layers must typically be tightly controlled to ensure proper performance of the resulting device.

Some OVL metrology techniques determine an OVL measurement by illumination of a portion of a test sample and collecting data associated with a symmetry of the test sample and/or overlapping features. However, such techniques are sensitive to measurement non-uniformities, which may manifest as errors in the OVL measurement and are commonly referred to as tool-induced shift (TIS) errors. It is to be understood that examples and illustrations throughout the present disclosure relating to a particular application of OVL metrology are provided for illustrative purposes only and should not be interpreted as limiting the disclosure.

As used herein, a TIS signature refers to a set of TIS values as a function of measurement wavelength for a training sample. TIS values may vary in response to process variations of the sample. In particular, the effect of process variations on TIS values in a sample may be site-specific, and a TIS model may be generated that includes information regarding the effects of site-specific process variations on TIS values. During test sample measurements where process variations are determined, a TIS signature may be inferred from the TIS model that is then be used to correct site-specific TIS for those known process variations. Therefore, when a process variation is determined for a test sample in run time, a tailored TIS signature can be generated that is used to remove TIS from a single-angle measurement of the sample.

The generation of a TIS model may include illuminating a training sample at first and second azimuthal angles and receiving spectral data from the detection of reflections from the training sample. The spectral data may include data from one or more off-diagonal Mueller matrix element pairs. Off-diagonal Mueller matrix element pairs that correspond to TIS signal magnitude or specific training process variations within the training sample, such as layer thickness, may then be used to train the model. Off-diagonal Mueller matrix elements that are selectively sensitive to TIS and selectively insensitive to OVL may also be used for training the model. The use of off-diagonal Muller matrix elements spectra for training may provide more effective TIS removal from overlay measurements than by relying solely only on TIS values.

Embodiments of the present disclosure are particularly advantageous over current TIS removal methods. For example, a simplistic method used for determining TIS from a test sample is to average OVL measurements in two opposing azimuthal directions (0° and 180°) followed by an addition of the second measurement and the first measurement, as shown in Equation 1 below:

$$TIS = \left(OVL^{0°} + OVL^{180°}\right)/2. \qquad \text{Equation 1}$$

OVL that has been cleaned of TIS can also be determined by averaging overlay (OVL) measurements in the two opposing azimuthal directions followed by a subtraction of the second measurement from the first measurement, as shown in Equation 2 below:

$$OVL_{cleaned} = \left(OVL^{0°} - OVL^{180°}\right)/2. \qquad \text{Equation 2}$$

However, this approach requires measuring the test sample in two azimuthal directions for each measurement set, greatly increasing measurement time. Whereas, when utilizing the method described in the present disclosure, once the model is trained, test samples need only be measured in one azimuthal direction, not two opposite azimuthal directions, decreasing overall measurement time. Further, embodiments of the present disclosure are advantageous as they can be implemented with minimal modifications to existing platform optic systems and software while providing an improvement in the number of samples measured per unit of time.

FIGS. 1A through 3 illustrate a system and method for removing a TIS signature from a test sample, in accordance with one or more embodiments of the disclosure.

FIG. 1A illustrates a conceptual view illustrating a semi-conductor device fabrication system 100, in accordance with one or more embodiments of the present disclosure. In one embodiment, the system 100 includes a metrology sub-system 102 configured to characterize one or more properties of a test sample 104. In another embodiment, the system 100 includes a controller 106 communicatively coupled to the metrology sub-system 102. In another embodiment, the controller 106 includes one or more processors 108 configured to execute program instructions maintained on a memory medium 110, or memory. For example, the one or more processors 108 of controller 106 may generate (e.g., train) a TIS model of a training sample by first receiving training data from the metrology sub-system 102 (e.g., from a detector within the metrology sub-system 102), deriving OVL spectra data and TIS spectra data from the training data, and decomposing the derived OVL spectra data and TIS spectra data. Based on the decomposed OVL spectra data and TIS spectra data, the one or more processors 108 of the controller 106 may remove the TIS signature from a measurement of a test sample 104 (e.g., the TIS signature inferred from the trained TIS model). For example, the one or more processors 108 of the controller 106 may receive spectra data for a single azimuthal angle measurement of the test sample, and then remove the TIS signature from the single azimuthal angle measurement of the test sample based on the TIS model.

Figure 1B:
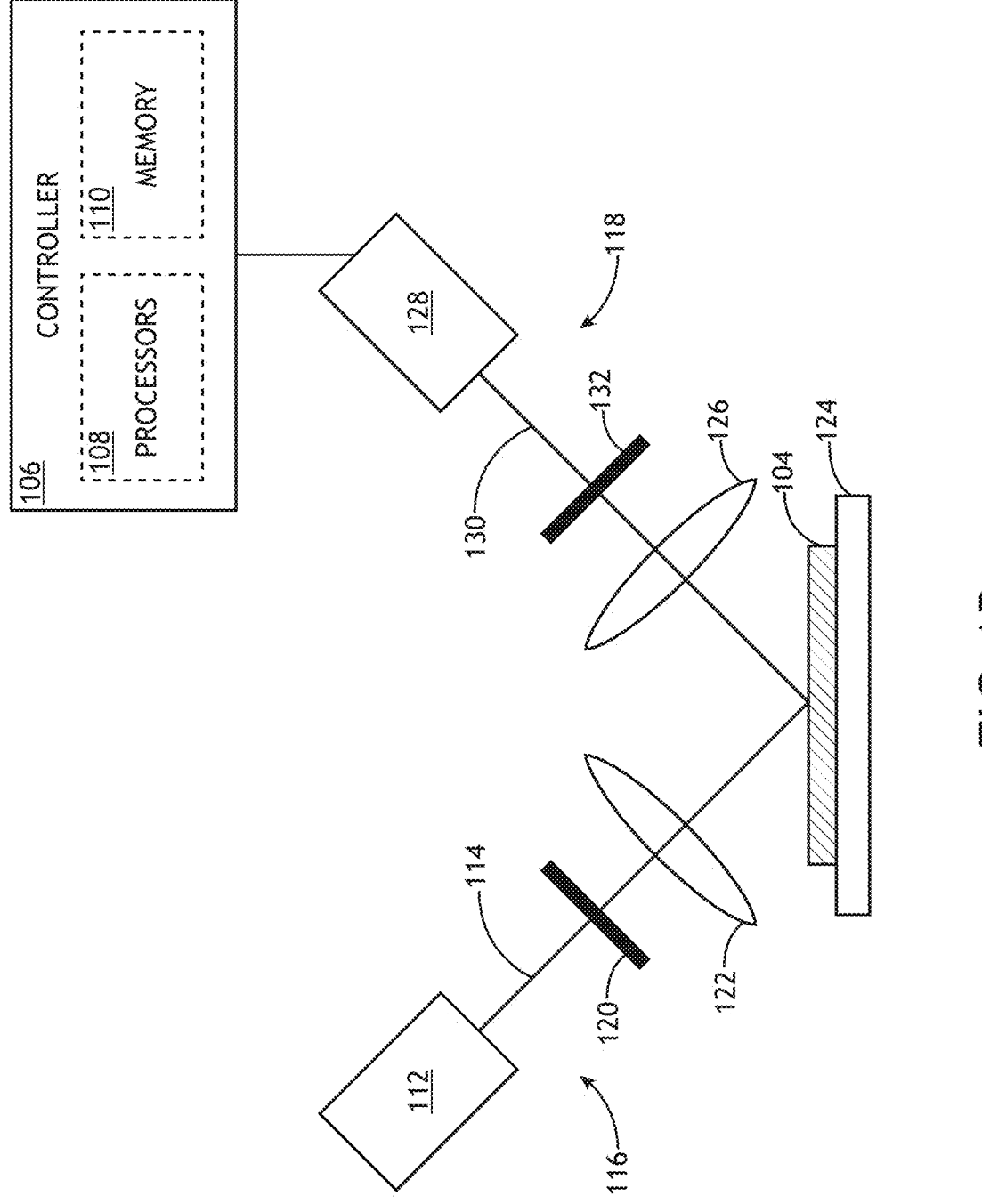
FIG. 1B illustrates a conceptual view of a metrology sub-system, in accordance with one or more embodiments of the present disclosure.

FIG. 1B illustrates a conceptual view of a metrology sub-system, in accordance with one or more embodiments of the present disclosure. In a general sense, the metrology sub-system 102 may illuminate the sample 104 with at least one illumination beam and collect at least one measurement signal from the sample 104 in response to the illumination beam. The illumination beam may include, but is not limited to, an optical beam (e.g., a light beam) at any wavelength or range of wavelengths. In this manner, the metrology sub-system 102 may operate as an optical metrology sub-system. The metrology sub-system may be configured as or include, but not be limited to, a spectroscopic ellipsometer (SE), an SE with multiple angles of illumination, an SE measuring Mueller matrix elements (e.g. using rotating compensator(s)), a single-wavelength ellipsometer, a beam profile ellipsometer (angle-resolved ellipsometer), a beam profile reflectometer (angle-resolved reflectometer), a broadband reflective spectrometer (spectroscopic reflectometer), a single-wavelength reflectometer, an angle-resolved reflectometer, an imaging system, or a scatterometer (e.g., speckle analyzer). The wavelengths for optical systems can vary from about 120 nm to 3 microns. For non-ellipsometer systems, signals collected can be polarization-resolved or unpolarized.

In one embodiment, the metrology sub-system 102 includes at least one illumination source 112 to generate illumination (e.g., one or more illumination beams 114). The illumination source 112 may provide, but is not required to provide, an illumination beam 114 having wavelengths in the range of approximately 100 nm to approximately 2,000 nm. In this regard, the illumination source 112 may generate illumination having wavelengths in any spectral range including, but not limited to, vacuum ultraviolet wavelengths, extreme ultraviolet wavelengths, visible wavelengths, or infrared wavelengths. For example, the illumination source 112 may provide an illumination beam spanning ultraviolet wavelengths such as, but not limited to 160 nm to 1000 nm. By way of another example, the illumination source 112 may provide an illumination beam spanning ultraviolet and visible wavelengths such as, but not limited to 150 nm to 900 nm. By way of another example, the illumination source 112 may provide an illumination beam spanning ultraviolet wavelengths such as, but not limited to 150 nm to 450 nm. Further, the metrology sub-system 102 may include any number of illumination sources 112 to provide illumination in any spectral range or ranges.

In another embodiment, the illumination source 112 provides a tunable source of illumination (e.g., one or more tunable lasers). By way of another example, the illumination source 112 may include a broadband illumination source coupled to a tunable filter.

The illumination source 112 may further provide an illumination beam 114 having any temporal profile. For example, the illumination beam 114 may have a continuous temporal profile, a modulated temporal profile, or a pulsed temporal profile.

In another embodiment, the metrology sub-system 102 includes an illumination sub-system 116 (e.g., an illumination pathway) to direct the illumination (e.g., one or more illumination beams 114) from the illumination source 112 to the test sample 104 and a collection sub-system 118 (e.g., collection pathway) to collect radiation (e.g., light) emanating from the sample 104. The illumination sub-system 116 may include one or more illumination beam conditioning elements 120 suitable for modifying and/or conditioning the illumination. For example, the one or more illumination beam conditioning elements 120 may include, but are not limited to, an illumination aperture stop, an illumination field stop, one or more polarizers, one or more compensators, one or more filters, one or more beam splitters, one or more diffusers, one or more homogenizers, one or more apodizers, one or more beam shapers, one or more mirrors, or one or more lenses. For example, the one or more illumination beam conditioning elements 120 may include one or more focusing mirrors that reflects the light and focuses the illumination beam to a spot onto the test sample.

In another embodiment, the illumination sub-system 116 may utilize a focusing assembly 122 to focus the illumination from one or more illumination sources 112 onto the test sample 104 disposed on a sample stage 124. For example, the focusing assembly 122 may include one or more optical elements having a non-zero optical power. In another embodiment, the collection sub-system 118 may include a collection assembly 126 to collect radiation from the test sample 104. For example, the collection assembly 126 may include one or more optical elements having a non-zero optical power.

In another embodiment, the metrology sub-system 102 includes a detector 128 configured to capture light emanating from the test sample 104 (e.g., sample light 130) through the collection sub-system 118. For example, a detector 128 may receive radiation reflected or scattered (e.g., via specular reflection, diffuse reflection) from the test sample 104. By way of another example, a detector 128 may receive radiation generated by the test sample 104 (e.g., luminescence associated with absorption of the illumination beam 114).

The detector 128 may include any type of optical detector known in the art suitable for measuring illumination received from the test sample 104. For example, a detector 128 may include, but is not limited to, a photodiode array (PDA), a charge-coupled device (CCD), a complementary metal-oxide-semiconductor (CMOS) detector, a time delay integration (TDI) detector, a photomultiplier tube (PMT), or an avalanche photodiode (APD). Further, the detector 128 may include any type of sensor having any geometry including, but not limited to, a planar sensor or a line sensor. In another embodiment, a detector 128 may include a spectroscopic detector suitable for identifying wavelengths of radiation emanating from the test sample 104.

For measurement techniques involving the collection of spectral data (e.g., spectroscopic reflectometry, or spectroscopic ellipsometry), it may be desirable to generate continuous spectral data over a spectral range of interest. For example, the metrology sub-system 102 may include a dispersive element (e.g., a prism or a grating) to spatially disperse light from the overlay target onto one or more detectors 128 to capture a spectral measurement.

In another embodiment, the metrology sub-system 102 may include multiple detectors 128 to facilitate multiple metrology measurements by the metrology sub-system 102. In this regard, the metrology sub-system 102 depicted in FIG. 1B may perform multiple simultaneous metrology measurements.

The collection sub-system 118 may further include any number of collection beam conditioning elements 132 to direct and/or modify illumination collected by the collection assembly 126 including, but not limited to, a collection aperture stop, a collection field stop, one or more mirrors, one or more lenses, one or more filters, one or more polarizers, or one or more compensators. For example, the one or more collection beam conditioning elements 132 may include one or more focusing mirrors that directs light to the detector 128. The collection beam conditioning elements 132 and the illumination beam conditioning elements 120 may be both referred to as beam conditioning elements 120, 132.

It is contemplated herein that a metrology sub-system 102 configured as a spectroscopic ellipsometer may illuminate the test sample 104 at any selected angle of incidence (AOI) and at any selected azimuth angle from 0 to 360 degrees.

Further, the spectroscopic ellipsometer may provide a series of measurements at various combinations of angle of incidence and azimuth angles.

Figure 2A:
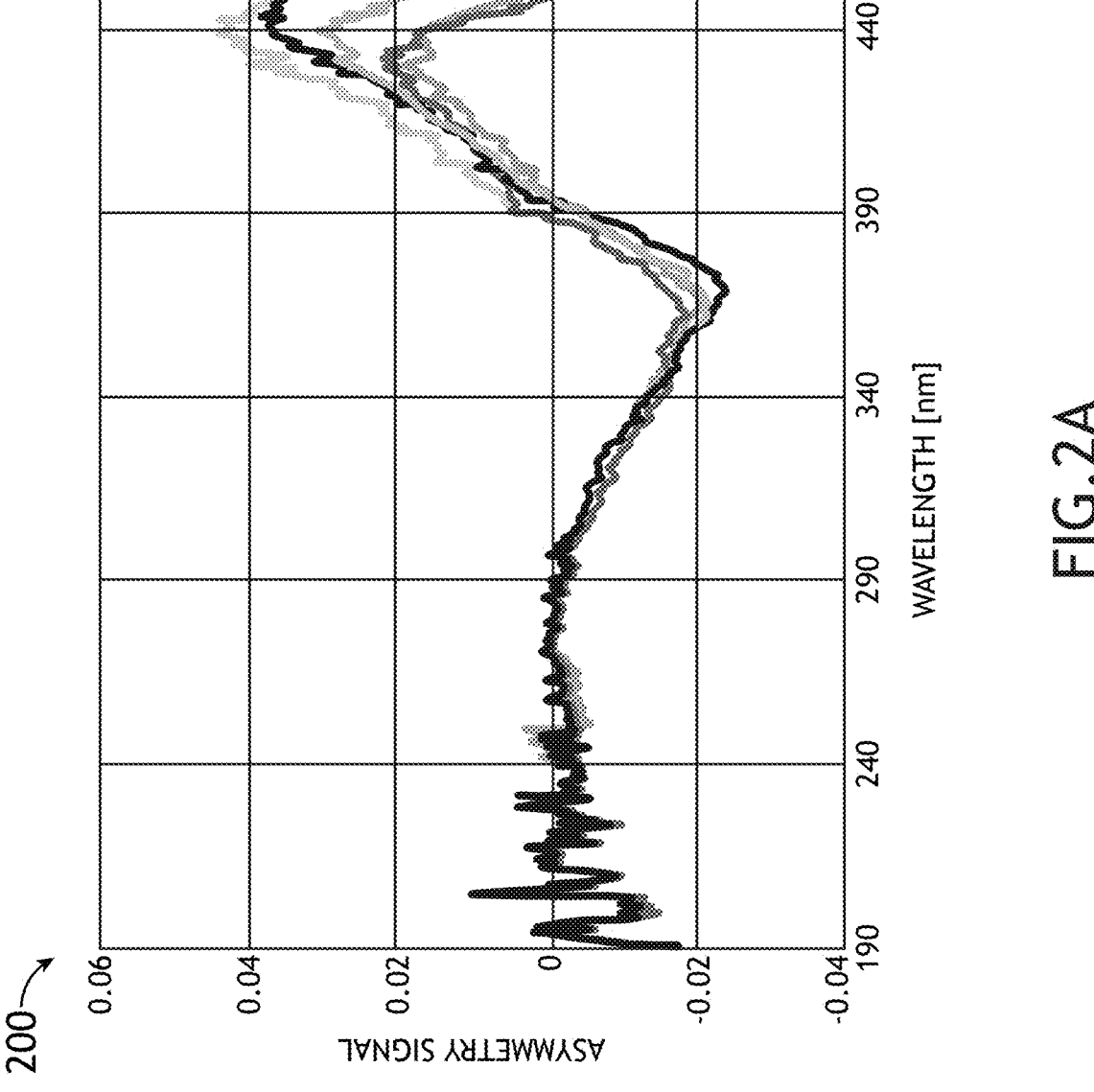
FIG. 2A illustrates a graph depicting simulated $M_{20}$-$M_{02}$ measurements of Tool-Induced Shift over range of wavelengths for a test sample, in accordance with one or more embodiments of the present disclosure.
Figure 2B:
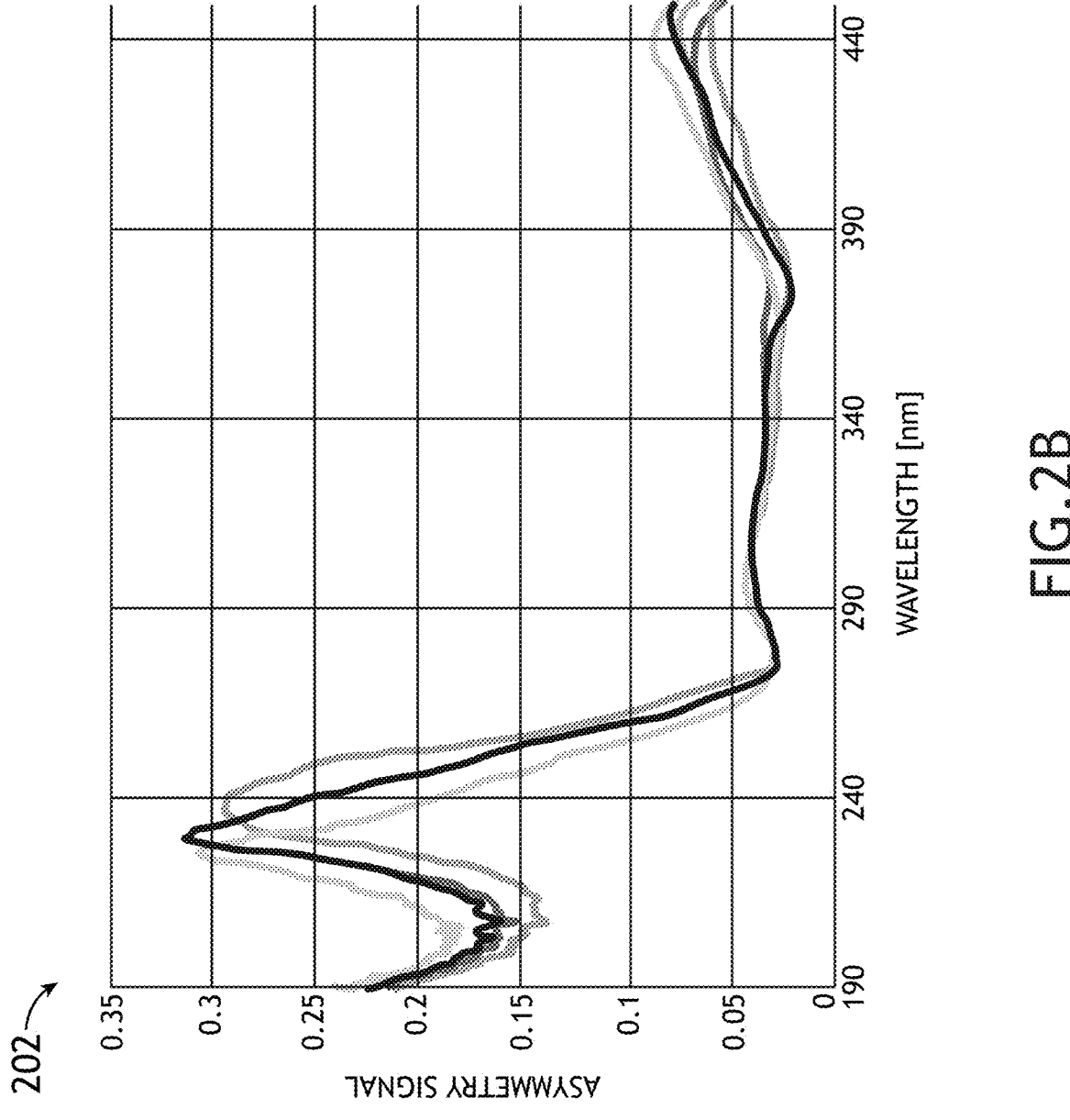
FIG. 2B illustrates a graph depicting simulated $M_{20}$-$M_{02}$ measurements of overlay over range of wavelengths for a test sample, in accordance with one or more embodiments of the present disclosure.

FIGS. 2A and 2B illustrate graph 200, 202 depicting simulated $M_{20}$-$M_{02}$ measurements of TIS and OVL, respectively, over a range of wavelengths for a training sample at a process variation, in accordance with one or more embodiments of the present disclosure. The asymmetry spectra are simulated for different values of overlay. Each asymmetry spectrum is determined as the difference between spectral measurements performed at a zero-azimuth angle and an azimuth angle of one hundred eighty degrees.

In embodiments, measured asymmetry is derived from one or more off-diagonal Muller Element pair differences. The Mueller matrix (M) is a 4×4 matrix that describes the sample being measured and may be written as follows:

$$M_{sample} = \begin{bmatrix} M_{00} & M_{01} & M_{02} & M_{03} \\ M_{10} & M_{11} & M_{12} & M_{13} \\ M_{20} & M_{21} & M_{22} & M_{23} \\ M_{30} & M_{31} & M_{32} & M_{33} \end{bmatrix}.$$

While diagonal elements of the Mueller matrix ($M_{00}$, $M_{11}$, $M_{22}$, $M_{33}$) describe intensity and basic polarization changes of a measured sample, the non-diagonal elements include six element pairs ($M_{10}$ and $M_{01}$, $M_{20}$, and $M_{02}$, $M_{30}$, and $M_{03}$, $M_{21}$ and $M_{12}$, $M_{31}$, and $M_{31}$, and $M_{32}$ and $M_{23}$) that describe interactions between different polarization states. Each of the six Mueller Matrix element pairs can be determined from spectra data collected from measurements from the sample. Increased differences between off-diagonal Mueller matrix element pairs correspond to increased asymmetry between measurements and may be considered an indicator of asymmetry.

Once the Mueller matrix element values are collected, Mueller Matrix element paired differences (pMΔ) may then be calculated. Of interest are Mueller matrix element pairs having pMΔ values that correlate to TIS magnitude. Also of interest are Mueller matrix element pairs having pMΔ values that correlate to TIS magnitude as a function of a process variation. As used herein, process variations refer to variations of sample attributes within a sample that can affect TIS per site (TIS 3σ) and may affect differences in OVL per site (OVL 3σ) as well. A process variation may include, but is not limited to, a layer thickness, a sample tilt, a length, a critical dimension, a height, a side wall angle, a film dispersion, and/or a width of a sample or a sample element. Detection and measurement of process variations are important for determining sample quality and prediction of functionality of a resulting semiconductor device.

Process variations may be detected and/or measured in the same manner or same measurements as used to determine Mueller Matrix element values. Process variations may also be detected and/or measured via another measurement or measurement modality. For example, the measurements of the training sample that result in the determination of the off-diagonal Mueller matrix elements may also be used to determine a layer thickness. In another example, layer thickness measurements may be provided by another instrument, such as via a scanning electron microscopy (SEM) device.

In embodiments, pMΔ values that are related to process variations (PV) that have been determined to be substantially correlated to increases in TIS are also assessed to determine if the values are substantially uncorrelated to OVL. For example, because OVL spectra and TIS spectra arise from different physical asymmetries, there is an expectation that at least one of the pMΔ values of the six off-diagonal Muller Element pairs will not be correlated between the TIS spectra and OVL spectra. For example, and as shown in FIGS. 2A-B, values for $M_{20}$-$M_{02}$ along the spectra for a process variation of a sample differ when calculating TIS than when calculating overlay. For instance, while the TIS spectra of $M_{20}$-$M_{02}$ in FIG. 2A shows peaks at approximately 365 nm and 440 nm, the OVL spectra of $M_{20}$-$M_{02}$ in FIG. 2A presents a band of peaks from 190 nm to approximately 265 nm. A TIS signature may then be generated that focuses on removing TIS where the differences between TIS and OVL values are large. By determining the correlation between process variations and TIS, a measurement of a process variation, such as layer thickness, may then be used along with the TIS signature to more precisely determine the magnitude of the TIS correction to apply.

One or more off-diagonal Mueller Matrix element pairs that have been determined to have both low OVL sensitivities and high TIS sensitivities may then be used for training and testing purposes. For example, the training and testing may include one or more off-diagonal Mueller matrix element pairs, two or more off-diagonal Mueller matrix element pairs, three or more off-diagonal Mueller matrix element pairs, four or more off-diagonal Mueller matrix element pairs, five or more off-diagonal Mueller matrix element pairs, or may include all six off-diagonal Mueller matrix element pairs.

In embodiments, spectral measurements of a training sample are used to train a TIS model that can identify or infer TIS signatures generated by the metrology sub-system 102. Once the TIS signatures have been identified, recipes for operating the metrology sub-system 102 can be generated that instruct the metrology sub-system 102 in measuring and deriving overlay spectra from test samples 104 and removing TIS signatures from the derived spectra (e.g., from a single azimuthal measurement). For example, and referring to FIGS. 2A-2B, because the TIS spectra and OVL spectra differ at different wavelengths (e.g., as a function of process variation), the TIS model may generate a TIS signature that can be used to selectively remove TIS, correcting error in the OVL measurement. The TIS signature is therefore not a universal or static control for removing TIS, but rather custom signature that is generated for each sample during runtime.

The TIS model may be generated or trained via one or more of mathematical modeling, statistical modeling (e.g., general linear modeling) or time series modeling), simulation modeling (e.g., system dynamic models or Monte Carlo simulations), empirical modeling, heuristic modeling, and artificial intelligence/machine learning modeling.

Figure 3:
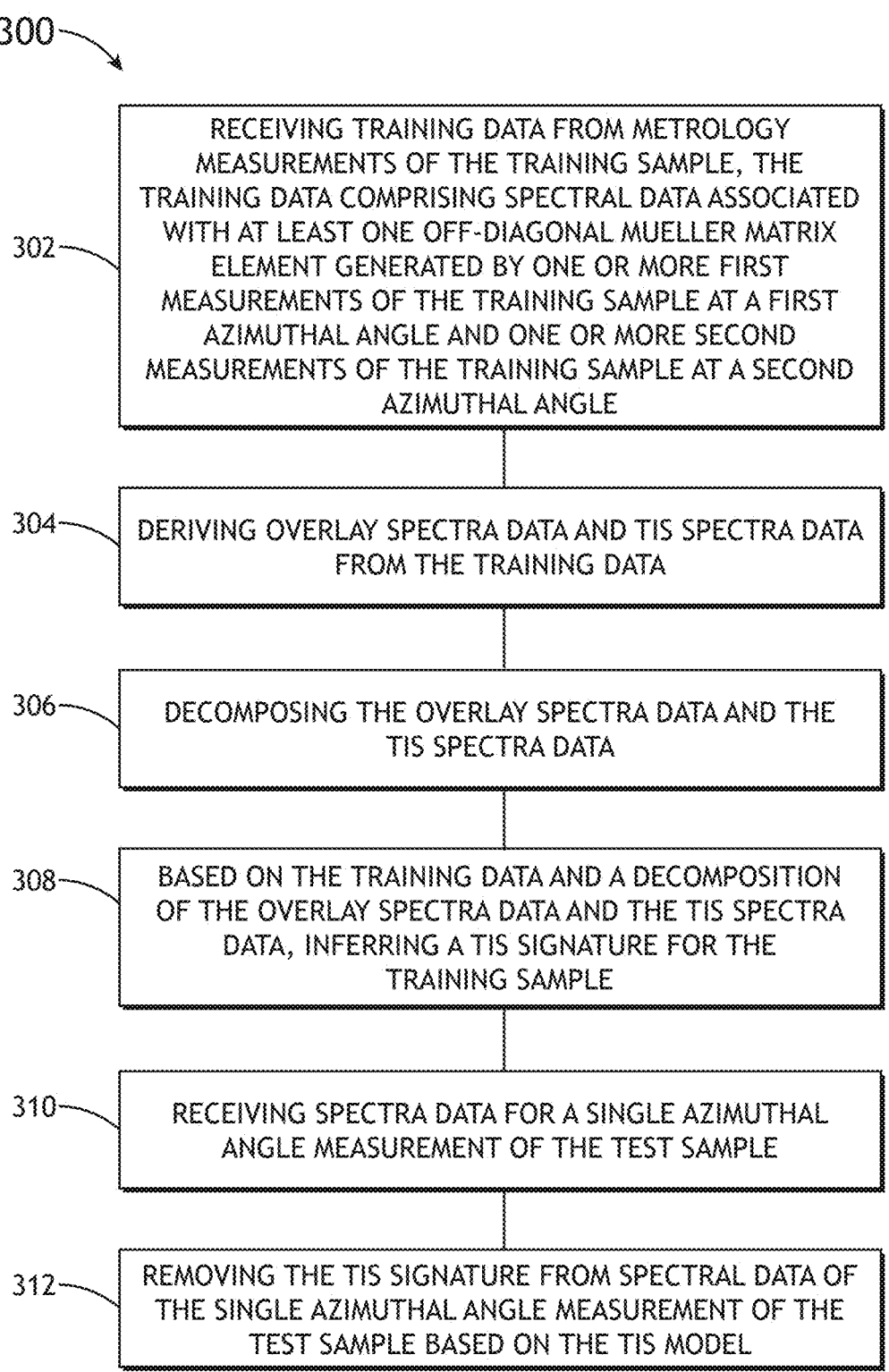
FIG. 3 illustrates a process flow diagram depicting a method for removing a (TIS) signature from a metrology measurement, in accordance with one or more embodiments of the present disclosure.

FIG. 3 illustrates a process flow diagram depicting a method 300 for removing a (TIS) signature from a metrology measurement, in accordance with one or more embodiments of the present disclosure. One or more steps of the method 300 may be performed by the semiconductor device fabrication system 100 and/or metrology sub-system 102 as described herein. For example, one or more steps of the method may be performed by one or more of the spectroscopic sub-systems and tools described herein, such as a spectroscopic ellipsometer.

In embodiments, the method 300 includes steps for generating (e.g., training) a TIS model of a training sample by the spectroscopic metrology sub-system, in accordance with one or more embodiments of the disclosure. In embodiments, generating the TIS model includes a step 302 of receiving training data from metrology measurements of a training sample, the training data comprising spectral data associated with at least one off-diagonal Mueller matrix element generated by one or more first measurements of the training sample at a first azimuthal angle and one or more second measurements of the training sample at a second azimuthal angle. For example, the metrology sub-system 102 may be used to collect spectra from both first and second azimuthal angles (e.g., 0° and) 180°. Up to six off-diagonal Mueller matrix pairs may be determined based on spectra generated under certain illumination conditions, with one or more of the off-diagonal Mueller matrix pairs associated with TIS. The one or more off-diagonal Mueller matrix pairs associated with TIS are then included as part of the training data that is received by the one or more processors 108. For example, values for all six off-diagonal Mueller matrix pairs may be included in the training data.

In embodiments, generating the TIS model further includes a step 304 of deriving overlay spectra data and TIS spectra data from the training data. For example, OVL spectral data may be derived from the equation 2 for one or more of the six non-diagonal Mueller matrix pairs. In another example, TIS spectral data may be derived from Equation 1 for one or more of the six non-diagonal Mueller matrix pairs. In instances where the correlation between non-diagonal Mueller matrix pairs and TIS are unknown, spectra for OVL and TIS may be derived for all six non-diagonal Mueller element pairs. In instances where the correlation between non-diagonal Mueller matrix pairs and TIS are known, non-correlating non-diagonal Mueller matrix pairs may be excluded from the calculations.

In embodiments, generating the TIS model further includes a step 306 of decomposing the overlay spectra data and the TIS spectra data. For example, generating the TIS model may include performing spectral decomposition, also referred to as eigen decomposition, which factorizes the Mueller matrix into canonical form using eigenvectors and eigenvalues. Mueller matrices are known to be decomposable to a plurality of factors using several approaches.

In embodiments, generating the TIS model further includes, based on the measurement data, a decomposition of the overlay spectra data, and/or the TIS spectra data, a step 308 of inferring or identifying a TIS signature for the training sample. For example, the TIS model may be trained via a machine learning method that takes the training data, such as the factors generated from the decomposition of the OVL spectral data and the TIS spectral data, and processes the data, resulting in a TIS signature that can be used for removing TIS from test samples.

In embodiments, the method 300 includes steps for removing the TIS signature from a test sample 104. In embodiments, removing the TIS signature from a test sample 104 includes a step 310 of receiving spectra data for a single azimuthal angle of a test sample and a step 312 of removing the TIS signature from the spectra data of the single azimuthal angle of the test sample. For instance, OVL spectra for a test sample may measure a single azimuthal angle (e.g., 0°). TIS may then be removed from the OVL spectra by subtracting the inferred TIS signature that was generated from the trained model. The inferred TIS signature provides an estimate of TIS without the need for providing data from a second azimuthal angle (e.g., 0°), reducing measurement time for the test sample.

In embodiments, the one or more off-diagonal Mueller matrix pairs included with the training data may include off-diagonal Mueller matrix pairs having pMΔ values that are substantially correlated to changes in magnitude in TIS. Off-diagonal Mueller matrix pairs not having pMΔ values substantially correlated with TIS may be excluded from the training data.

In embodiments, the one or more off-diagonal Mueller matrix pairs included with the training data may include off-diagonal Mueller matrix pairs having pMΔ values that are substantially correlated to changes in magnitude in TIS, with the changes in magnitude in TIS further correlated to changes in magnitude of a process variation, such as layer thickness or one or more process variations as described herein. For example, different locations in a sample, such as a wafer, may be characterized by different layer thicknesses. Once the first and second azimuthal measurements of the training sample are completed, one or more of the differing layer thicknesses may be determined to be substantially correlated to a TIS, and one or more of the six off-diagonal Mueller matrix pairs derived at these locations may also show substantial correlation to TIS and thus be included in the training data. During measurement of test sample, spectra generated from these off-diagonal Mueller elements may then be used to determine the magnitude of the TIS signature that is to be removed from the single azimuthal measurement of the test sample.

While all six off-diagonal Mueller matrix pairs may be included in the training data, off-diagonal Mueller matrix pairs not having pMΔ values substantially correlated to changes in magnitude of a process variation (e.g., which may also be correlated to changes in magnitude of TIS), may be excluded from the training data. Process variations measured on the sample may be determined from the data gathered during the first and second azimuthal measurements or may be determined using other instrumentation, as described above. The ability of the system and method to consider the correlation between TIS signatures and process variations is particularly advantageous over other methods that rely only on systems that model TIS values without considering differences in process variations, such as layer thickness, along the sample. Considering off-diagonal Muller elements spectra that are used for their process variation sensitivities provides an independent indication for process variation-inducing-TIS3σ, which may provide better information toward removing TIS from OVL. In other words, by considering process variations in the method 300, the method 300 then leverages process variation-sensitive off-diagonal Mueller matrix elements for reducing TIS3σ.

In embodiments, the one or more off-diagonal Mueller matrix pairs associated with TIS may further include off-diagonal Mueller matrix pairs that have PMA values that are substantially correlated to changes in magnitude of TIS and are substantially uncorrelated or insensitive to changes in magnitude of OVL. For example, once the first and second azimuthal measurements of the training sample are completed, one or more process variations may be determined to be both associated with a relatively large change in magnitude in TIS and a relatively small change in magnitude of OVL indicating TIS signature that should be removed from OVL. While all six off-diagonal Mueller matrix pairs may be included in the training data, off-diagonal Mueller matrix pairs that do not have pMΔ values that are substantially correlated to changes in magnitude of TIS and are substantially uncorrelated or insensitive to changes in magnitude of OVL may be excluded from the training set. By using off-diagonal Muller matrix elements with low OVL sensitivities, but large TIS sensitivities, for TIS cleaning, the method may utilize off-diagonal Muller matrix elements that are not directly used for OVL derivation. This comparison strategy may be further limited to the use of off-diagonal Mueller matrix elements that are substantially correlated to both TIS and process variations.

As used herein, "substantially correlated" may refer to $pM\Delta$ values that show consistent and/or considerable correlation to changes in magnitude in TIS over a wavelength or a band of wavelengths. For example, and as shown the FIG. 2A, in calculating TIS, the $pM\Delta$ values (e.g., dimensionless values that correspond to dimensionless asymmetry values) deviate substantially from zero at approximately 365 nm (e.g., approximately –0.02), and 440 nm (e.g., approximately 0.04). By deviating substantially from zero at 440 nm, the off-diagonal Mueller matrix element pair $M_{20}$-$M_{02}$ may be considered substantially correlated to TIS at that wavelength.

In embodiments, "substantially correlated" to a TIS spectra may refer to $pM\Delta$ values that differ by ±0.01 or more from zero, by ±0.02 or more from zero, by ±0.04 or more from zero, by ±0.08 or more from zero, by ±0.12 or more from zero, by ±0.24 or more from zero, by ±0.48 or more from zero, by ±0.96 or more from zero, or by ±1.92 or more from zero.

As used herein, "substantially uncorrelated" may refer to $pM\Delta$ values that do not show consistent and/or considerable correlation to changes in magnitude in OVL over a wavelength or a band of wavelengths. For example, and as shown the FIG. 2B, in calculating OVL, the $pM\Delta$ values do not deviate substantially from zero at a band of wavelengths from approximately 270 nm to 440 nm, wherein the magnitude of $pM\Delta$ values falls below 0.1. By not deviating substantially from zero at that bandwidth, the off-diagonal Mueller matrix element pair $M_{20}$-$M_{02}$ may be considered substantially uncorrelated to OVL at that bandwidth. "Substantially uncorrelated" to an OVL spectra may refer to $pM\Delta$ values for OVL that differ by ±0.25 or less from zero, by ±0.50 or less from zero, by ±1.0 or less from zero, by ±2.0 or less from zero, by ±0.40 or less from zero, or by ±8.0 or less from zero.

In embodiments, the one or more off-diagonal Mueller matrix pairs associated with TIS may include off-diagonal Mueller matrix pairs having relatively or substantially high ratios between TIS $pM\Delta$ values ($pM\Delta_{TIS}$) and OVL $pM\Delta$ values ($pM\Delta_{OVL}$). For example, referring to FIGS. 2-3, when measuring the sample at 440 nm, $pM\Delta_{TIS}$ is approximately 0.04, while $pM\Delta_{OVL}$ is approximately 0.09, for a ratio ($pM\Delta_{TIS}$: $pM\Delta_{OVL}$) of approximately 0.44. In contrast, at 230 nm, $pM\Delta_{TIS}$ is approximately –0.001, while $pM\Delta_{OVL}$ is approximately 0.3, for a ratio ($pM\Delta_{TIS}$: $pM\Delta_{OVL}$) ratio of approximately 0.003, over a one-hundred-fold difference. Therefore, the one or more off-diagonal Mueller matrix pairs used for training the model may be determined by the selection of those off-diagonal Mueller matrix pairs having elevated ratios between $pM\Delta_{TIS}$ and $pM\Delta_{OVL}$ for a wavelength or band of interest. Substantially high ratios for $pM\Delta_{TIS}$: $pM\Delta_{OVL}$ may include ratios greater than 0.01, 0.5, 0.1, 0.5, or 1.0.

Training data used for training the TIS model step 302 may include any type of data generated by any type of overlay metrology sub-system. Similarly, the TIS signature generated in step 302 may utilize any suitable overlay recipe to provide overlay measurements based on the device overlay data as inputs. Any type of machine language modeling technique may be used for determining the TIS signatures of the training samples, including, but not limited to, a supervised machine-learning technique, an unsupervised machine-learning technique, a model assist approach, a model-less approach, a reference-based approach, a self-calibrated recipe, or a combination thereof.

In embodiments, the training may be analyzed by a number of data fitting and optimization techniques such as, but not limited to, machine-learning algorithms (e.g., machine learning libraries, linear machine learning models, neural networks, convolutional networks, or support-vector machines (SVM)), dimensionality-reduction algorithms (e.g., PCA (principal component analysis), ICA (independent component analysis), or LLE (local-linear embedding)), fast-reduced-order models, regression, sparse representation (e.g., Fourier transform techniques or wavelet transform techniques), Kalman filters, or algorithms to promote matching from same or different tool types. Further, statistical model-based metrology is generally described in U.S. Pat. No. 10,101,670, which is incorporated herein by reference in its entirety. By way of another example, the device overlay data may be analyzed by algorithms that do not include modeling, optimization and/or fitting such as patterned wafer characterization is generally described in U.S. Patent Publication No. 2015/0046121, which is incorporated herein by reference in its entirety.

By way of another example, the overlay recipe may include modeling or simulation of the optical interaction of the illumination beam 114 with the sample 104 using various techniques including, but not limited to, rigorous coupled-wave analysis (RCWA), finite element method (FEM) analysis, method of moments techniques, surface integral techniques, volume integral techniques, or finite-difference time-domain (FDTD) techniques. Further, the device targets may be, but are not required to be, modeled or parametrized using a geometric engine, a process modeling engine or a combination thereof. The use of process modeling is generally described in U.S. Patent Publication No. 2014/0172394, which is incorporated herein by reference in its entirety.

In embodiments, the training data includes beam conditioning data that describes the effect of the one or more beam conditioning elements 120, 132 on the metrology measurements. For example, in spectral ellipsometry, beam conditioning elements 120, 132, such as focusing mirrors, may affect TIS signatures, particularly specific components of the beam conditioning elements 120, 132, such as coatings (e.g., focusing mirror coatings). Parameters or other data from these beam conditioning elements 120, 132 known to effect TIS signatures may be added to the training data, increasing model accuracy.

In embodiments, one or more of the one or more parameters of the one or more conditioning elements 120, 132, may be changed in order to increase or improve spectral separability between TIS spectral values and OVL spectral values. Spectral values may include, but not be limited to, spectral shape, Mueller matrix element, $pM\Delta$, dominant spectral region, or average spectral values (e.g., over a wavelength or band of wavelengths). The one or more parameters to be changed may include, but not be limited to, a mirror coating. For example, the coating of a focusing mirror of the metrology sub-system 102 may be altered or optimized to increase the separability between TIS spectral values and OVL spectral values. Although TIS elimination through changes in hardware (e.g., conditioning elements 120, 132) may be a long-term goal in spectral metrology, increasing or optimizing TIS separability, such as through changing coating parameters of a focusing mirror, would appear to be a simpler goal that can be more easily accomplished.

The one or more processors 108 of controller 106 may include any one or more processing elements known in the art. In this sense, the one or more processors 108 may include any microprocessor-type device configured to execute software algorithms and/or instructions. In embodiments, the one or more processors 108 may consist of a desktop computer, mainframe computer system, workstation, image computer, parallel processor, or other computer system (e.g., networked computer) configured to execute a program configured to operate the system 100, as described throughout the present disclosure. It should be recognized that the steps described throughout the present disclosure may be carried out by a single computer system or, alternatively, multiple computer systems. In general, the term "processor" may be broadly defined to encompass any device having one or more processing elements, which execute program instructions from a non-transitory memory medium 110. Moreover, different subsystems of the system 100 (e.g., metrology sub-system 102) may include a processor or logic elements suitable for carrying out at least a portion of the steps described throughout the present disclosure.

The memory medium 110 may include any memory medium known in the art suitable for storing program instructions executable by the associated one or more processors 108 (e.g., the instructions configured to cause the one or more processors 108 to perform various functions). For example, the memory medium 110 may include, but is not limited to, a read-only memory, a random-access memory, a magnetic or optical memory device (e.g., disk), a magnetic tape, or a solid-state drive. In embodiments, the memory medium 110 is configured to store one or more results from the metrology sub-system and/or the output of the various data processing steps described herein. It is further noted that memory medium 110 may be housed in a common controller housing with the one or more processors 108. In an alternative embodiment, the memory medium 110 may be located remotely with respect to the physical location of the processors and controller 106. For instance, the one or more processors 108 of controller 106 may access a remote memory (e.g., server), accessible through a network (e.g., internet or intranet).

It is further noted that, while FIG. 1A depicts the controller 106 as being embodied separately from the metrology sub-system 102, such a configuration of system 100 is not a limitation on the scope of the present disclosure but is provided merely for illustrative purposes. For example, the controller 106 may be embodied in a controller of the metrology sub-system 102.

All of the methods described herein may include storing results of one or more steps of the method embodiments in a memory medium. The results may include any of the results described herein and may be stored in any manner known in the art. The memory medium may include any memory medium described herein, or any other suitable memory medium known in the art. After the results have been stored, the results can be accessed in the memory medium and used by any of the method or system embodiments described herein, formatted for display to a user, used by another software module, method, or system, etc. Furthermore, the results may be stored "permanently," "semi-permanently," temporarily," or for some period of time. For example, the memory medium may be random access memory (RAM), and the results may not necessarily persist indefinitely in the memory medium.

It is further contemplated that each of the embodiments of the method described above may include any other step(s) of any other method(s) described herein. In addition, each of the embodiments of the method described above may be performed by any of the systems described herein.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems. Further, the one or more processors 108 may provide feedforward information to downstream process tools and sub-systems to adjust process conditions for the substrate in question as it progresses along the semiconductor fabrication line.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable and/or wirelessly interacting components, and/or logically interacting and/or logically interactable components.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

What is claimed:
1. A spectroscopic metrology system, comprising:
a spectroscopic metrology sub-system; and
a controller communicatively coupled to the spectroscopic metrology sub-system, the controller including one or more processors configured to execute program instructions stored in memory and configured to cause the one or more processors to:
generate a tool-induced shift (TIS) model of a training sample by the spectroscopic metrology sub-system comprising:
receiving training data from metrology measurements of the training sample, the training data comprising spectral data associated with at least one off-diagonal Mueller matrix element generated by one or more first measurements of the training sample at a first azimuthal angle and one or more second measurements of the training sample at a second azimuthal angle;
deriving overlay spectra data and TIS spectra data from the training data;
decomposing the overlay spectra data and the TIS spectra data; and
based on the training data and a decomposition of the overlay spectra data and the TIS spectra data, inferring a TIS signature for the training sample; and
remove the TIS signature from a measurement of a test sample comprising:
receiving spectra data for a single azimuthal angle measurement of the test sample; and
removing the TIS signature from the spectral data of the single azimuthal angle measurement of the test sample based on the TIS model; and
providing one or more adjustments to one or more process tools following removal of the TIS signature.

2. The spectroscopic metrology system of claim 1, further comprising:
determining from the training data one or more off-diagonal Mueller matrix elements with spectra that correlate to a process variation measurement of the training sample and an magnitude of the TIS spectra data, wherein the TIS signature is based on the spectra from the one or more off-diagonal Mueller matrix elements.

3. The spectroscopic metrology system of claim 2, wherein the process variation measurement is derived from the metrology measurements.

4. The spectroscopic metrology system of claim 2, wherein the process variation measurement is derived from another metrology measurement.

5. The spectroscopic metrology system of claim 1, wherein the first azimuthal angle and the second azimuthal angle are separated by 180 degrees.

6. The spectroscopic metrology system of claim 2, wherein the one or more off-diagonal Mueller matrix elements are substantially correlated to the magnitude of the TIS spectra data and are substantially uncorrelated to a magnitude of the overlay spectra data.

7. The spectroscopic metrology system of claim 2, wherein the process variation measurement comprises a sample thickness.

8. The spectroscopic metrology system of claim 2, wherein the process variation measurement comprises a sample tilt.

9. The spectroscopic metrology system of claim 1, wherein the spectroscopic metrology sub-system comprises at least one of a spectroscopic ellipsometer, a spectroscopic reflectometer, a single-wavelength ellipsometer, a single-wavelength reflectometer, an angle-resolved ellipsometer, or an angle-resolved reflectometer.

10. The spectroscopic metrology system of claim 1, wherein the TIS model comprises a trained machine learning model.

11. The spectroscopic metrology system of claim 1, wherein the spectroscopic metrology sub-system includes one or more beam conditioning elements, wherein the training data includes beam conditioning data that describes an effect of the one or more beam conditioning elements on the metrology measurements.

12. The spectroscopic metrology system of claim 11, wherein the one or more beam conditioning elements comprise a focusing mirror.

13. The spectroscopic metrology system of claim 12, wherein the beam conditioning data comprises parameters of a coating of the focusing mirror.

14. A method for removing a tool-induced shift (TIS) signature from a metrology measurement comprising:

generating a TIS model of a training sample by a spectroscopic metrology sub-system comprising:

receiving training data from metrology measurements of the training sample, the training data comprising spectral data associated with at least one off-diagonal Mueller matrix element generated by one or more first measurements of the training sample at a first azimuthal angle and one or more second measurements of the training sample at a second azimuthal angle;

deriving overlay spectra data and TIS spectra data from the training data;

decomposing the overlay spectra data and the TIS spectra data; and based on the training data and a decomposition of the overlay spectra data and the TIS spectra data, inferring a TIS signature for the training sample; and removing the TIS signature from a measurement of a test sample comprising:

receiving spectra data for a single azimuthal angle measurement of the test sample; and removing the TIS signature from spectral data of the single azimuthal angle measurement of the test sample based on the TIS model; and providing one or more adjustments to one or more process tools following removal of the TIS signature.

15. The method of claim 14, further comprising:

determining from the training data one or more off-diagonal Mueller matrix elements with spectra that correlate to a process variation measurement of the training sample and a magnitude of the TIS spectra data, wherein the TIS signature is based on the spectra from the one or more off-diagonal Mueller matrix elements.

16. The method of claim 14, wherein the first azimuthal angle and the second azimuthal angle are separated by 180 degrees.

17. The method of claim 15, wherein the one or more off-diagonal Mueller matrix elements are substantially correlated to a magnitude of the TIS spectra data and are substantially uncorrelated to a magnitude of the overlay spectra data.

18. The method of claim 15, wherein the process variation measurement comprises a sample thickness.

19. The method of claim 15, wherein the process variation measurement comprises a sample tilt.

20. The method of claim 15, wherein the TIS method is performed by at least one of a spectroscopic ellipsometer, a spectroscopic reflectometer, a single-wavelength ellipsometer, a single-wavelength reflectometer, an angle-resolved ellipsometer, or an angle-resolved reflectometer.

21. The method of claim 15, wherein the TIS model comprises a trained machine learning model.

22. The method of claim 14, wherein the spectroscopic metrology sub-system includes one or more beam conditioning elements, wherein the training data includes beam conditioning data that describes an effect of the one or more beam conditioning elements on the metrology measurements.

23. The method of claim 22, wherein the one or more beam conditioning elements comprise a focusing mirror.

24. The method of claim 23, wherein the beam conditioning data comprises parameters of a coating of the focusing mirror.

25. The method of claim 22, further comprising changing one or more parameters of the one or more beam conditioning elements to increase a spectral separability between TIS spectral values and overlay spectral values.

26. The method of claim 25, wherein the one or more beam conditioning elements comprises a focusing mirror.

27. The method of claim 26, wherein the one or more parameters comprises a focusing mirror coating.

* * * * *